Oct. 5, 1948.  A. J. BENT  2,450,464
LOAD COMPENSATING BRAKE
Filed Jan. 31, 1946  3 Sheets-Sheet 1

INVENTOR
ARTHUR J. BENT
BY
ATTORNEY

Oct. 5, 1948.   A. J. BENT   2,450,464
LOAD COMPENSATING BRAKE
Filed Jan. 31, 1946   3 Sheets-Sheet 2

FIG. 2

INVENTOR
ARTHUR J. BENT
BY
ATTORNEY

Patented Oct. 5, 1948

2,450,464

UNITED STATES PATENT OFFICE 2,450,464

LOAD COMPENSATING BRAKE

Arthur J. Bent, Penn Township, Allegheny County, Pa., assignor to The Westinghouse Air Brake Company, Wilmerding, Pa., a corporation of Pennsylvania Application January 31, 1946, Serial No. 644,446

44 Claims. (Cl. 303—22)

This invention relates to load compensating or variable load brake equipment for vehicles, and more particularly to that type of equipment which is constructed and arranged to be automatically adjusted or conditioned to vary the braking force according to the position that the vehicle body, under various loads, assumes relative to a vertically fixed part of a truck.

The present trend toward the use of light weight materials in the construction of railway freight cars has resulted in much higher ratios of gross weight to tare weight than ever before encountered. Since the braking force in relation to the weight of an empty car must be such as to avoid wheel sliding and excessive train shock, the braking force on lighter weight cars will consequently have to be lower than heretofore. Because the gross weight is limited only by the load limit for the trucks, which remain unchanged, the lower braking force will be inadequate for proper control of such cars when loaded.

The principal object of this invention, therefore, is to provide a variable load brake equipment which will operate in conjunction with the present type of fluid pressure brake equipment so that the braking force will be sufficiently low on an empty car to prevent wheel sliding and will be increased in relation to any increase in the gross weight of the car so that a loaded or partially loaded car may be properly controlled in a train.

Another object is to provide a variable load brake equipment which will require only a single standard auxiliary reservoir and only a single brake cylinder, and which will operate in conjunction with the other parts of the standard fluid pressure freight brake equipment to obtain substantially the present application and release time intervals on a car without altering the flow capacities of any passages in such other parts.

Still another object is to provide a variable load brake equipment of the type employing a single brake cylinder in which the effectiveness of the fluid pressure may be varied, the effective pressure for any given application being proportioned according to the weight of the load carried by the vehicle.

A further object is to provide a variable load brake equipment employing a single brake cylinder, which brake cylinder will have substantially the same displacement volume as the standard freight brake cylinder.

A still further object is to provide a variable load brake equipment which employs a single brake cylinder and which will provide in the brake cylinder substantially the same fluid pressure curve characteristics as in the standard brake cylinder regardless of the loading on the vehicle.

To attain these objects the variable load brake mechanism embodying this invention employs a single brake cylinder device, which preferably has a larger diameter and a shorter piston travel than the standard device. The lower degree of braking force which is necessary for vehicles carrying lighter loads is obtained by the use of a relay valve mechanism which includes two opposed diaphragms having operatively coupled thereto a self-lapping valve arrangement. One diaphragm is arranged to operate the valve arrangement, in response to the pressure of fluid being supplied to one side of a brake cylinder piston in the usual manner, to supply this fluid to the opposite side of the brake cylinder piston and to the other diaphragm until such opposing brake cylinder pressure acts on the other diaphragm to move the valve arrangement to its lapped position. By reason of the shape of the follower for the first mentioned diaphragm the degree of effectiveness of said diaphragm decreases, and therefore the amount of fluid supplied to the opposite side of the brake cylinder piston decreases, as the diaphragm is positioned further away from its follower. The diaphragm is positioned, according to the weight of the load carried, by a mechanism which is responsive to fluid under pressure supplied from the brake pipe while being charged below a certain degree of pressure to initially actuate a measuring element into engagement with a vertically fixed part relative to a sprung part of the vehicle, and thereafter to displace the first mentioned diaphragm away from its follower a distance which becomes greater as the weight of the lading becomes greater. Thus the opposing fluid pressure on the brake cylinder piston decreases and the braking force increases as the shiftable diaphragm is displaced further away from its follower toward load position according to the increase in the weight of the lading on the vehicle.

Other objects and advantages will become apparent in the following more detailed description of the invention taken in connection with the accompanying drawing wherein the Fig. 1 is a diagrammatic view partly in section of a variable load brake equipment embodying the invention.

DESCRIPTION

Figure 1:
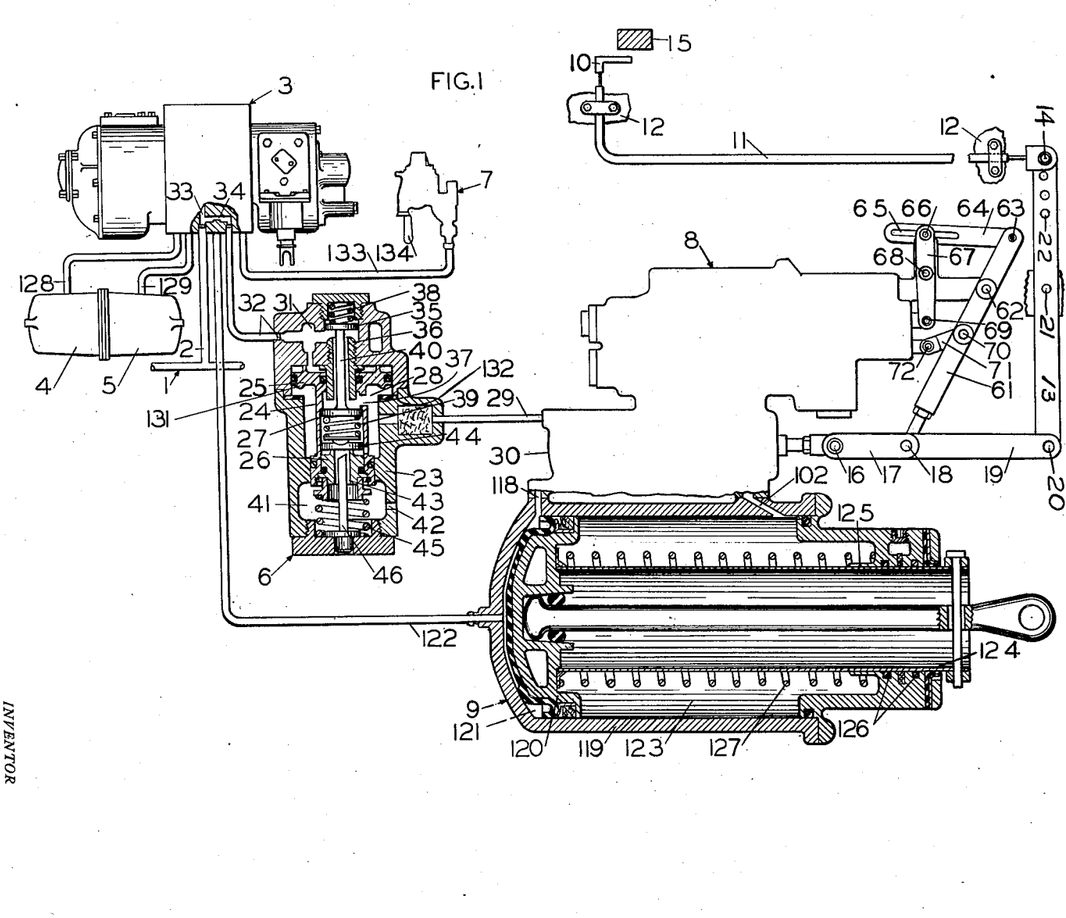

As shown in the drawing, the variable load fluid pressure brake equipment may comprise the usual brake pipe indicated by the reference numeral 1, a branch pipe 2, a brake controlling valve device 3, an auxiliary reservoir 4, an emergency reservoir 5, a cut-off valve device 6, retaining valve device 7, a variable load valve mechanism 8 and a brake cylinder device 9.

The brake controlling valve device 3 may be of substantially the same construction and have the same operating characteristics as the "AB" valve device fully described in the patent to Clyde C. Farmer, No. 2,031,213, issued February 18, 1936 and assigned to the assignee of the present invention, and in view of this it is deemed unnecessary to show and describe this device in detail. It will of course, be understood that this device operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a release of the brakes and the charging of the brake equipment.

It is preferred for this invention that the variable load valve mechanism 8 be mounted by any suitable means to a sprung portion of a car, such as the under side of the car body, so that the deflection of the springs resulting from a change in the weight of the lading on a car equipped with an apparatus embodying this invention may be measured and the mechanism conditioned according to this deflection. For this purpose a measuring element 10 may be operably attached to one end of the wire portion of a Bowden wire 11, which wire portion may be slidably mounted in the usual sheath or covering securely clamped to the car body 12, the wire portion being attached at its other end to a lever 13 by means of a pin 14, so that the measuring element 10 may be actuated upwardly into engagement with a bottom surface 15 of a vertically stationary part such as a truck axle for example, or a horizontal bar attached to a spring plank or other part fixed vertically relative to a sprung part. Measuring movement of the element 10 may be effected through the operation of the variable load valve mechanism 8 acting through the medium of a pivotal pin 16, a link 17 which is connected by means of a pin 18 to a link 19, and through the lever 13 which is pivotally connected to the link 19 by means of a pin 20. The lever 13 is rockably mounted by means of a pin 21 on a sprung part of the car, preferably, the underside of the car body. A series of holes 22 are provided along the lever 13 for the reception of the pin 14 so that the leverage may be adjusted to correspond to the range of spring deflection for any particular car.

The cut-off valve device 6 is provided for the purpose of controlling the supply of fluid under pressure from the brake pipe 1 to the variable load valve mechanism 8 for the operation of the measuring element 10 so as to cut off said supply when the brake pipe is charged from atmospheric pressure to a predetermined degree of pressure and to stay cut off until the brake pipe pressure is reduced to a certain predetermined lower degree. This valve device 6 may comprise a casing 23 having slidably mounted therein a double piston member 24 comprising a large piston 25, a small piston 26, and a hollow stem 27 extending between and connecting both pistons. Defined by the pistons 25 and 26 together with the casing 23 is a chamber 28 which is in constant open communication by way of a passage and pipe 29 with a load measuring cylinder 30 in the variable load valve mechanism 8.

At the other side of the piston 25 there is a chamber 31 which is in constant open communication by way of a pipe and passage 32 with a brake pipe passage 33 provided in the brake controlling valve device 3, the passage 33 having a choke 34 therein. In the chamber 31 a valve 35 is mounted so as to operatively engage a tubular valve seat member 36. This valve seat member 36 is mounted in the casing 23 so as to extend from the chamber 31 through the piston 25 so as to establish, together with a port or ports 37 in the piston stem 27, a communication between chambers 31 and 28, which communication is controlled by the valve 35. Also contained in the chamber 31 is a spring 38 which biases the valve 35 toward its seated position. Resiliently secured in the piston member 24 by means of a spring 39 is a strut member 40 which extends through the tubular valve seat member 36 and normally holds the valve 35 in its unseated position in which it is shown in the drawing.

At the other side of the piston 26 is a chamber 41 which is constantly open to atmosphere by way of a passage 42. As will more fully appear later, communication may also be established between chamber 41 and the chamber 28 by way of a bore 43 through the piston 26, which bore is normally closed at its inner end by an exhaust valve 44. This valve 44 is carried within the piston 26 at the lower end of the spring 39, which spring biases said valve toward its seated position in which it is shown. Interposed between and operatively engaging the bottom wall of the casing 23 and the lower end of the piston member 24 is a spring 45 which constantly urges the piston member 24 toward the position in which it is shown. For unseating the valve 44 upon downward movement of the piston member 24 a stem 46 is mounted in the chamber 41 and extends axially through said chamber and a part of the bore 43 in the piston 26 toward the under side of the valve 44.

The load measuring cylinder 30 of the variable load valve mechanism 8 comprises (Fig. 2) a casing 47 containing a piston 48 defining, with the casing, a fluid pressure chamber 49 at one side of the piston, which chamber is constantly open to the cut-off valve device 6 by way of the pipe 29, and at the other side a spring chamber 50 which is constantly open to atmosphere by way of a passage 51 in the casing 47. Interposed between the casing 47 and the piston 48 and operatively engaging the same is a spring 52 which tends, at all times, to move the piston toward the left-hand position in which it is shown. The piston 48 is provided with a stem 53, which stem extends through the chamber 50 and a suitable opening 54 in the casing 47 to make connection exteriorly with the link 17 by means of an adjustable shank 55 and the pin 16.

Figure 2:
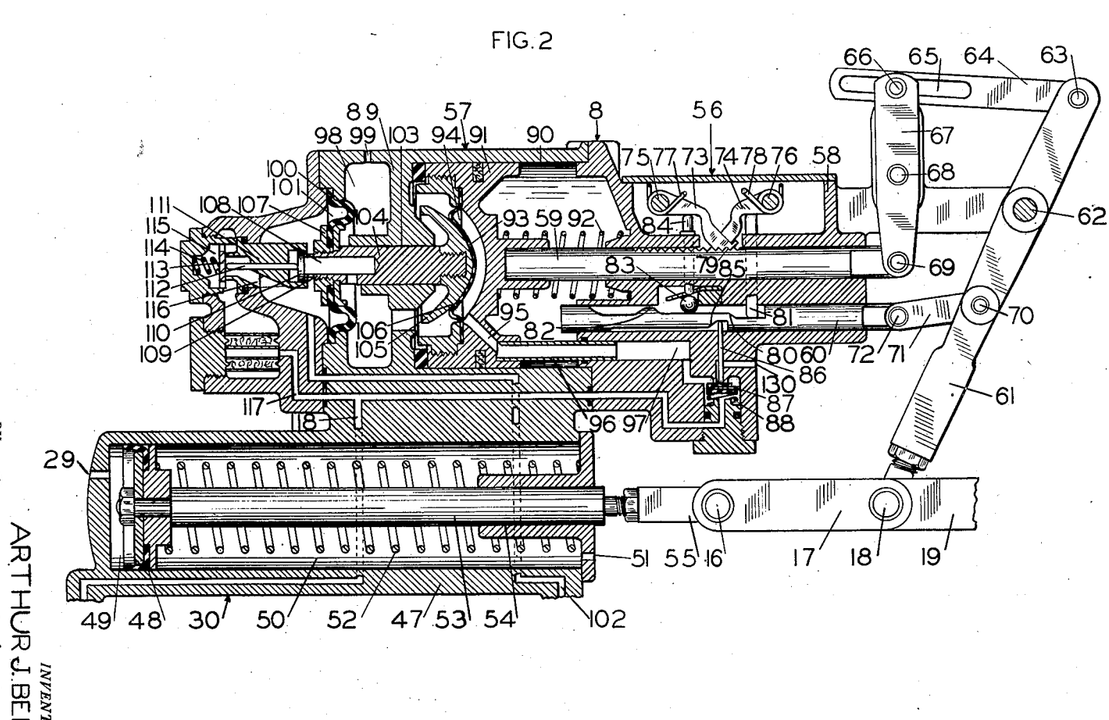
Fig. 2 is an enlarged diagrammatic view in section of a portion of the variable load brake equipment shown in Fig. 1.

The variable load valve mechanism 8 further comprises an adjusting mechanism 56 and a relay valve mechanism 57, the adjusting mechanism acting under the power and control of the load measuring cylinder 30 to condition the relay valve mechanism for operation according to the weight of the lading on the car. The adjusting mechanism 56 comprises a casing 58 having slidably mounted therein a diaphragm positioning bar 59 and a cam member 60 for controlling the locking of the bar 59. An operating lever 61 is rockably mounted on the casing 58 by means of a pin 62 for operatively connecting the load measuring piston 48 to the bar 59 and the cam member 60. The lower end of the operating lever 61 makes a jointed connection with the stem 53 of the piston 48 by means of the pin 18, link 17, pin 16 and adjustable shank 55. The upper end of the lever 61 is operatively connected with the end of the bar 59 by means of a pivot pin 63 and a link 64, which link has slidably mounted in a slot 65 therein a pin 66 at the upper end of a lever 67, the lever 67 being rockably mounted on a pin 68 carried by the casing 58 and joined at its lower end to the bar 59 by means of a pin 69. Intermediate the pins 18 and 62, the operating lever 61 is operatively connected with the cam member 60 by means of a pin 70, link 71 and pin 72.

The positioning bar 59 is held in its adjusted position by means of a pawl 73 under a dog 74 rockably mounted on their respective pins 75 and 76 carried by the casing 58. The pawl 73 and dog 74 are pressed by torsion springs 77 and 78, respectively, so as to rock the pawl into locking engagement with a toothed portion 79 of the bar 59 and rock the dog 74 against the pawl 73 to hold the pawl in its locking position. The cam member 60 is provided with an inclined surface 80 which is effective through the medium of a strut 81 to rotate the dog 74 out of engagement with the pawl 73 when the cam member is shifted outwardly. An inverted V-shaped projection 82 on the cam member 60 may effect, through the medium of a spring-pressed ball 83 and a strut 84, the disengagement of the pawl 73 in a similar manner. The cam member 60 is further provided with an inclined surface 85 which effects through the medium of a strut 86, the movement of a spring biased check valve 87 mounted in a chamber 88 formed in the casing 58 from its exhaust closing position to its supply closing position.

As will later be pointed out, the relay valve mechanism 57 embodies a number of novel constructions and control characteristics. This mechanism comprises a casing 89 having formed therein a cylindrical bore 90 in which is slidably mounted an annular diaphragm carrying member 91 which is rigidly attached to one end of the diaphragm positioning bar 59 for movement thereby. Interposed between the casing 58 and the member 91 is a spring 92 which constantly urges the member to the left toward empty position in which it is shown. Tightly clamped about its periphery between two parts of the member 91 is a flexible diaphragm 93 which with the member 91 defines a pressure chamber 94. This chamber 94 is in constant open communication with the valve chamber 88 by way of a passage 95 and a tube 96, the tube being arranged to move with the member 91 and telescope within a passage 97 formed in the casing 58.

At the other side of the diaphragm 93 is a chamber 98 which is always open to atmosphere by way of a passage 99. Spaced from the diaphragm 93 and serving therewith to define the chamber 98 is a flexible diaphragm 100 rigidly clamped about its periphery between two parts of the casing 89. On the other side of the diaphragm 100 there is a valve chamber 101 which is in constant open communication by way of a passage 102 with the brake cylinder device 9.

Contained in the chamber 98 and slidably mounted in a bore 103 in the casing 89 is a thrust member 104 having mounted at one end a movable abutment or follower member 105 which may operatively engage a portion of the diaphragm 93. A surface 106 of the movable abutment 105 is in the form generally of a paraboloid. As the member 91 is moved to the right away from the member 105 the surface 106 will engage less and less of the diaphragm 93 until in the extreme right-hand position, which is load position, it will just engage in tangential relationship the adjacent surface of the diaphragm 93. As will be apparent subsequently, the exact curvature of the surface 106 will depend upon the desired relationship between the degree of braking force desired to the weight of the lading on the car. If a straight-line relationship is desired it will be found from experiment that surface 106 should conform substantially in curvature to a parabola, as viewed in Fig. 2.

Mounted on the other end of the thrust member 104 is a follower member 107 having a bore and passage 108 therein which at its inner end is open to the chamber 98 and at its outer end leads to the chamber 101. The outer end of the bore and passage 108 is encircled by a valve seat 109 which is normally engaged by an exhaust valve 110 mounted in a support member 111 in the chamber 101 and secured to the casing 89. A strut 112 engages the outer side of the valve 110 and extends through a suitable opening in the support member 111 to engage the inner surface of a supply valve 113. This supply valve 113, in response to the pressure of a spring 114, operatively mounted in a chamber 115, normally closes a passage 116 leading from the chamber 101 to the chamber 115. The chamber 115 is in constant open communication with the valve chamber 88 by way of a passage 117 and with the brake cylinder 9 by way of an additional passage 118 leading from passage 117.

Referring now to Fig. 1, it will readily be seen that the brake cylinder device 9 is not of the conventional type having a pressure chamber at one side of a piston and a non-pressure, or atmospheric chamber at the other side of the piston. The brake cylinder device 9 is provided with a cylinder casing 119 and a piston 120 having at one side a chamber 121 which is open to the chamber 115 in the relay valve device 57 by way of passages 118 and 117 and to the brake controlling valve device 3 by way of a pipe 122. At the other side of the piston 120 is a chamber 123 which is open to the chamber 101 in the relay valve device 57 by way of the passage 102. The piston 120 is provided with a hollow stem 124 which is arranged to extend through the chamber 123 and a suitable opening 125 in the casing 119. At this opening, however, the casing 119 is provided with a pair of sealing rings 126 which slidably engage the casing 119 and the hollow stem 124 so that fluid pressure may be established in the chamber 123, which chamber is defined by the piston 120, the walls of the casing 119 and the hollow stem 124. Contained in the chamber 123 and encircling the stem 124 is a release spring 127 for returning the piston 120 to release position when the fluid under pressure in the brake cylinder chamber 121 and pipe 122 is released.

The piston 120 is of such diameter that it can provide, under normal operating pressures, sufficient force to brake a fully loaded car, which diameter might be 12 inches. When lighter loads are carried in the car, the variable load valve mechanism 8 operates to supply fluid under pressure to the chamber 123. It will be noted, however, that the back pressure thus created is effective only over that area of the piston which will serve to define the chamber 123. Since it is preferred to keep this area small, the piston stem 124 will have a relatively larger diameter, such as seven (7) inches for example, than that of the usual brake cylinder piston stem.

OPERATION

*Initial charging of the equipment*

Assuming the vehicle embodying the invention to be empty and separated from a train, the brakes on the vehicle released, the brake pipe 1 of the vehicle depleted of fluid under pressure and the diaphragm 93 of the variable load valve mechanism 8 temporarily disposed in the empty position in which it is shown, the brake controlling valve device 3 will be in brake applied position and the several other parts of the equipment will be in the positions in which they are shown.

Now if the empty vehicle is placed on a train, the brake pipe 1 will of course be connected at each end of the vehicle to the corresponding brake pipe at the adjacent end of each adjacent vehicle of the train and as a result the brake equipment is in condition to be charged with fluid under pressure in the usual manner. In initially charging the equipment, fluid under pressure supplied in the usual manner to the brake pipe 1 flows through the branch pipe 2 to the chambers at the faces of the service and emergency pistons of the brake controlling valve device 3, moving the pistons in due course to their brake release and equipment charging position. Fluid under pressure will then flow to the several other chambers of the brake controlling valve device 3, and thence in the usual manner, to the auxiliary reservoir 4 by way of a pipe 128, and to the emergency reservoir 5 by way of a pipe 129. At the same time, fluid under pressure will also flow from the brake pipe 1 through branch pipe 2, passage 33 and the choke 34 therein, and connected pipe and passage 32 to chamber 31 in the cut-off valve device 6. From chamber 31 fluid under pressure flows through the tubular valve seat member 36 to chamber 28, and thence by way of connected passage and pipe 29 to chamber 49 of the load measuring cylinder 30 in the variable load valve mechanism 8. In response to the pressure of fluid thus supplied to the chamber 49, piston 48 will move to the right against the opposing pressure of the spring 52, effecting, through the medium of the stem 53, shank 55, pin 16, link 17, pin 18, link 19, and pin 20 the rocking of the lever 13 in a counter-clockwise direction about the pin 21. As the lever 13 is rocked in this manner it acts through the medium of the pin 14 and the Bowden wire 11 to move the measuring element 10 upwardly into engagement with the bottom surface of a vertically stationary part of the vehicle. Movement of the piston 48 to the right acting through the medium of the shank 55, pin 16, link 17, pin 18, also effects the rocking in a counter-clockwise direction of the lever 61 about the pivot pin 62. As the lever 61 rocks in this manner it causes, through the medium of the pin 70, link 71 and pin 72, the outward movement, to the right as viewed in Fig. 2, of the cam member 60. As the member 60 moves outwardly, the surface 80 thereof will engage the adjacent end of the stem 81, thereby propelling the stem 81 in an upward direction. Upward movement of the stem 81 will cause the dog 74 to rock against the force of the spring 78 in a clockwise direction about the pin 76 and away from the pawl 73, thus leaving the pawl free to be rocked out of engagement with the bar 59. Further outward movement of the cam member 60 will cause the spring-pressed ball 83 to remain located under the strut 84 so that when the boss 82 passes under the ball 83, it will effect through the medium of the strut 84, the rocking of pawl 73 in a counter-clockwise direction about the pin 75 and against the force of the spring 77, and thus out of engagement for a period of time with the toothed portion 79 of the bar 59.

It will be noted that the pawl 73 serves as a detent against inward movement only of the bar 59. Consequently, with the bar located in its innermost or empty position in which it is shown in Fig. 2 there will be no reaction to the disengagement of the pawl 73 from the bar. If, however, the bar 59 had previously been locked in some position to the right of the position in which it is shown, disengagement of the pawl 73 would permit the spring 92 to return the diaphragm carrying member 91 to empty position. Thus, it will be seen that, during the charging of the brake pipe 1 from atmospheric pressure, the member 91 will automatically be returned to empty position before it is again positioned according to the weight of the lading on the vehicle. If by reason of an accident the bar should fail thereafter to position according to the weight of the lading, the equipment will be conditioned for braking an empty vehicle and overbraking of an empty or lightly loaded vehicle, which would cause serious damage, is automatically prevented.

By reason of the engagement of the inclined surface 85 of the cam member 60 with the adjacent end of the strut 86 outward movement of the cam member will effect movement of valve 87 from its upper seated position in which it is shown to its lower seated position. For reasons which will appear more fully later, fluid under pressure in chamber 94 may then flow to atmosphere by way of tube 96, passage 97, chamber 88 and a passage 130. Seating of the valve 87 in its lower position will prevent any supply of fluid under pressure from the passage 117 to the chamber 94.

Rotation of the lever 61 in a counter-clockwise direction also causes movement of the link 64 toward the left hand as viewed in Fig. 2, moving the right-hand end of the slot therein toward engagement with the pin 66. With the vehicle empty, however, the movement of the piston 48 in an outwardly direction, and consequently rocking of the lever 61 in a counter-clockwise direction, will be arrested by the engagement of the measuring element 10 with the surface 15 before the link 64 operatively engages the pin 66. The diaphragm carrying member 91 of the variable load valve mechanism 8 will therefore remain in the position in which it is illustrated, which is the position for braking an empty vehicle.

Now when the pressure of fluid in the chamber 28 of the cut-off valve device 6 has increased to approximately 50 pounds the pressure of fluid acting on the piston 26 will be sufficient to overcome the opposing pressure of the spring 45 and the piston member 24 will be caused thereby to shift in a downward direction until an annular sealing rib 131 provided on the piston 25 engages a gasket 132 secured in chamber 28 between two parts of the casing 23. Downward movement of the piston member 24 causes the strut member 40 to move in a downward direction and thus permits the spring 38 to actuate the valve 35 into sealing engagement with the tubular seat member 36 to cut off further flow of fluid under pressure from chamber 31 to chamber 28 by way of said member. Upon downward movement of the piston member 24 the valve 44 is carried into engagement with the stem 46, so that the continued downward movement of the piston 26 causes the piston 26 to move out of sealing engagement with the now stationary valve 44. Fluid under pressure in chamber 49 of the load measuring cylinder 30 may now flow to atmosphere by way of pipe 29, chamber 28 of the cut-off valve device 6, passages 37 in the piston member 24, chamber 27 therein, bore 43 in the piston 26, chamber 41 and atmospheric passage 42.

When the pressure of fluid in chamber 49 of the load measuring cylinder 30 is slightly less than the opposing pressure of the spring 52, said spring will act to shift the piston 48 to return the various associated parts to the positions in which they are shown. Movement of the piston 48 to the left will cause rocking of the levers 61 and 13 in a clockwise direction, thereby reversing the movement previously described and moving the measuring element 10 and the cam member 60 back to the positions in which they are shown.

It will be noted that, prior to the cut-off operation of the valve device 6 previously described, the fluid at brake pipe pressure acted over the relatively small area of the piston 26 to oppose the upward force of the spring 45. Now, after the cut-off operation, the fluid at brake pipe pressure will act over that portion of the piston 25 which is encircled by the seating rib 131 to oppose the upwardly directed force of the spring 45. Since the effective area which is exposed to brake pipe pressure is now much greater, it will be apparent that the brake pipe pressure will have to be reduced to some low degree of pressure (such as 20 pounds) before the spring 45 may prevail and return the piston and valve assemblage to the position in which it is shown in Fig. 1.

*Application of the brakes on an empty vehicle*

When it is desired to effect an application of the brakes, the brake pipe pressure is reduced in the usual manner, causing the brake controlling valve device 3 to function to supply fluid under pressure from the auxiliary reservoir 4 to the brake cylinder device 9 in order to advance the usual brake shoes, not shown, into frictional engagement with the vehicle wheels. The flow of fluid under pressure from the auxiliary reservoir 4 to the brake cylinder device 9 is by way of the pipe 128, through the brake controlling valve device 3 and pipe 122 to the brake cylinder chamber 121. Fluid under pressure may flow from chamber 121 by way of passages 118 and 117 to chamber 115 in the relay valve device 57. Fluid under pressure in passage 117 may also flow by way of valve chamber 88, passage 97, tube 96, and passage 95 to the control chamber 94 in the relay valve device 57.

When the pressure of fluid in the chamber 94 becomes sufficient to overcome the force of the spring 114, the diaphragm 93 will act through the medium of the thrust member 104, stem 112 and exhaust valve 110 to effect the movement of the supply valve 113 toward the left against the opposing pressure of the spring 114, unseating the valve 113. Fluid under pressure in chamber 115 may now flow past the unseated valve 113 into chamber 101, and thence by way of passage 102 to chamber 123 in the brake cylinder device 9. When the pressure of fluid in chamber 101 together with the pressure of the spring 114 becomes sufficient to prevail over the pressure of fluid in chamber 94 acting on diaphragm 93, diaphragm 100 will act through the medium of its follower 107 to shift the thrust member 104 toward the right, thereby permitting the spring 114 to move the valve 113 into seating engagement with the support member 111.

Referring to Fig. 1, it will be understood that the pressure of fluid in chamber 121 and acting over the full area of the brake cylinder piston 120 will prevail over the opposing pressures of the spring 127 and of the fluid in chamber 123, acting over that portion of the piston 120 which serves to define chamber 123, in an amount sufficient to transmit a braking force to the brake rigging for braking an empty vehicle to the degree called for by the degree of reduction in brake pipe pressure. By reason of the self-lapping arrangement of the valves in the relay valve mechanism 57 a constant proportion of back pressure to the pressure in chamber 121 will be maintained in chamber 123 of the brake cylinder device 9. If the degree of back pressure should exceed the predetermined proportion, this excess pressure acting in chamber 101 on the diaphragm 100 will cause the diaphragm to deflect to the right as viewed in Fig. 2, carrying the valve seat 109 formed on the end of the follower member 104 away from sealing engagement with the exhaust valve 110. Fluid under pressure in chamber 101 will then flow past the valve seat 109 through the bore and passage 108 to chamber 98 and thence to atmosphere by way of passage 99. When this flow of fluid reduces the pressure of fluid in chamber 101 to the predetermined degree, the diaphragm 93 will act in response to the pressure of fluid in chamber 94 to return the valve seat 109 to seated engagement with the valve 110.

*Release of the brakes with the equipment conditioned for empty car operation*

When it is desired to effect a release of the brakes, the brake pipe pressure is increased in the usual manner, causing the brake controlling valve device 3 to function to establish communication from the brake cylinder device 9 to atmosphere by way of the retaining valve device 7. Fluid under pressure now flows by way of pipe 122 from the brake cylinder device 9 to the brake controlling valve device 3, and from there by way of a pipe 133 to the retaining valve device 7, which connects pipe 133 directly to atmosphere when a handle 134 thereof is in the position in which it is shown. Brake cylinder device 9 now responds to the release of fluid under pressure therefrom in the usual manner to effect a release of the vehicle brakes. Upon the release of fluid under pressure from the chamber 121, fluid under pressure will also be released from the chamber 94 of the relay valve mechanism 57 by way of the passage 95, tube 96, passage 97, chamber 88, passage 117, and passage 118. Upon release of fluid under pressure from chamber 94, the fluid pressure in chamber 101 acting on the diaphragm 100 will cause the diaphragm to function in the manner previously described to release fluid under pressure from chamber 123 to atmosphere by way of passage 102, chamber 101, bore and passage 108, chamber 98 and passage 99.

*Automatic changeover operation of the equipment of a partially loaded vehicle*

Assuming now that the brakes on the vehicle are applied and that the vehicle is separated from the train and that while the brake pipe is at atmospheric pressure, lading is placed on the body of the vehicle. Under the influence of such additional weight, the vehicle body and consequently the body parts 12, Bowden wire 11 and measuring element 10, will move downwardly relative to the fixed surface 15 by reason of the usual truck springs (not shown) yielding to the additional weight.

Now when the vehicle is connected in a train, the brake pipe starts to charge with fluid under pressure in the same manner as hereinbefore described in connection with the charging of an empty vehicle. As before described, fluid under pressure which is supplied to the brake pipe 1 flows by way of pipe 32 to chamber 31 in the cut-off valve device 6, whence it flows by way of tubular valve seat member 36, chamber 28 and passage and pipe 29 to chamber 49 in the load measuring cylinder 30. In response to the pressure of fluid in chamber 49 of the load measuring cylinder 30, piston 48 will move outwardly in the direction of the right hand against the opposing pressure of the spring 52, thereby causing the levers 61 and 13 to rotate or rock in a counterclockwise direction. As previously described, this movement of the lever 61 will cause the cam member 60 to move outwardly and thereby effect the disengagement of the pawl 73 and dog 74. It will be understood that just prior to this action the cam member 60 also acted through the engagement of the surface 85 with a strut 86 to move the valve 87 in chamber 88 from its upper seated position to its lower seated position and thus to close off the supply of fluid under pressure from passage 117, and thereby connected chamber 121 of the brake cylinder device 9, and to vent the fluid under pressure in chamber 94 to atmosphere by way of the passage 95, tube 96, passage 97, chamber 88 and atmospheric passage 130. In this manner the stresses on member 91 and connected bar 59 are relieved so that the pawl 73 and dog 74 are free to operate without undue wear or damage while the brakes on the vehicle remain applied. As a result of the additional deflection of the truck springs in response to the additional weight of lading on the vehicle, the measuring element 10 will be further removed from the surface 15 and consequently the lever 13 will be permitted to rock in a greater arc and the lever 61 to which it is positively coupled will likewise rock through a greater arc. The lever 61 will act through the medium of the pin 63 to shift the link 64 toward the left hand, the link engaging the pin 66 at the right-hand end of the slot 65 and rocking the lever 67 in a counter-clockwise direction about the pin 68. The lever 67 will act through the medium of the pin 69 to move the bar 59 and associated diaphragm carrying member 91 and diaphragm 93 outwardly relative to the abutment 105 for a distance commensurate with the distance which the car body and measuring element 10 have moved downwardly, from the surface 15 of the vertically fixed part on the truck in response to the weight of the lading added to the vehicle.

When the brake pipe pressure is increased to the degree required to effect the operation of the cut-off valve device 6, this device will operate as described before to vent fluid under pressure from the chambers 31, 28 and 49. With the chamber 49 thus vented, the piston 48 and the stem 53 of the load measuring cylinder 30 will respond to the force of the spring 52 and move inwardly to the position in which they are shown. As a result of this movement the measuring element 10 will be retracted from engagement with the surface 15 and the connected levers 13 and 61 will be rocked in a clockwise direction. Clockwise rocking of the lever 61 will cause the cam member 60 to be shifted inwardly causing the valve 87 to move to its upper seated position to close the atmospheric communication and again connect passage 117 to the chamber 94, and also permitting the spring 78 to again actuate the dog 74 into operative engagement with the pawl 73. It will be remembered that the pawl 73 under the influence of the spring 77 had previously been actuated into locking engagement with bar 59 when the boss 82 of the cam member 60 passed to the right of the ball 83. It should be noted that movement of the cam member 60 in an inward direction carries the ball 83 out of engagement with the stem 84 so that the ball does not operate to disengage the pawl 73 from the tooth portion 79. Consequently, the bar 59 and the diaphragm carrying member 91 will remain in their load adjusted position.

With the diaphragm carrying member 91 and diaphragm 93 positioned as just described, the variable load valve mechanism 8 is now in condition for braking the vehicle according to the weight carried by the vehicle.

*Application of the brakes on a partially loaded vehicle*

When an application of the brakes is made on a partially loaded vehicle by effecting a reduction in brake pipe pressure, the operation of the brake controlling valve device 3 will be identical with the operation described for an empty vehicle. From this it will be understood that fluid under pressure will be supplied through pipe 122 to the brake cylinder device 9 and from chamber 121 therein to chambers 94 and 115 in the relay valve mechanism 57 by way of passages 118 and 117 in a manner previously described for the application of the brakes on an empty vehicle.

The pressure of fluid in the chamber 94 tends to deflect the diaphragm 93 and shift the follower 105 toward the left against the pressure of the spring 114. It will be understood that the diaphragm carrying member 91 will now be in some position to the right of that which it is shown in Fig. 2 by reason of which the diaphragm 93 may not engage as much of the surface 106 of the movable abutment 105, as when braking an empty vehicle as shown in Fig. 2. When the pressure of fluid in chamber 94 is sufficient to overcome the pressure of the spring 114, the thrust member 104 will be caused through the medium of movable abutment 105 to move to the left and act through the medium of the follower 107, valve 110 and stem 112 to unseat the supply valve 113. Fluid under pressure in the chamber 121 of the brake cylinder device 9 will now flow by way of passages 118 and 117, chamber 115, passage 116 and passage 102 to chamber 123 at the opposite side of a piston 120 in the brake cylinder device 9 to thereby reduce the effective force exerted on the piston 120 by the fluid pressure in chamber 121. When the pressure of fluid in the chamber 101, and consequently in the chamber 123, acting on the diaphragm 100 is sufficient to overcome the opposing pressure of fluid in chamber 94 acting, through the medium of the diaphragm 93, over that portion of the surface 106 now engaged by the diaphragm 93, thrust member 104 will be caused by the diaphragm 100 and follower 107 to move to the right and permit the spring 114 to move the valve 113 into seating engagement with the member 111, thus closing the passage 116. Since the area of the diaphragm 93 which effectively engages the movable adjacent surface 106 of the movable abutment 105 is now less, it will be apparent that the opposing fluid pressure in chamber 101 required to balance with the pressure of fluid in chamber 94 will now be less. With the pressure of fluid in connected chambers 101 and 123 for a given reduction thus reduced according to the load on the vehicle, the effective force exerted by the piston 120 in the brake cylinder device 9 for a given reduction will therefore be increased according to the weight of the lading on the vehicle.

*Release of a service application of the brakes on a partially loaded vehicle*

When it is desired to effect a release of the brakes of a partially loaded vehicle, the brake pipe pressure is increased in the usual manner, causing the brake controlling valve device 3 to function to establish communication from the chamber 121 in the brake cylinder device 9 to atmosphere by way of the retaining valve device 7. Fluid under pressure now flows by way of pipe 122 from the chamber 121 in the brake cylinder device to the brake controlling valve device 3, and from there by way of pipe 133 to the retaining valve device 7 which connects pipe 133 directly to the atmosphere. As the pressure of fluid in chamber 121 is thus reduced, fluid under pressure in chamber 94 flows by way of passage 95, tube 96, passage 97, chamber 88, passages 117 and 118 to chamber 121 and thence to atmosphere by the route just described. When the pressure of fluid in chamber 94 is thus reduced the pressure of fluid in chamber 101 will act through the medium of its follower 107, to shift the valve seat 109 out of engagement with the valve 110. Fluid under pressure will then flow from chamber 123 in the brake cylinder device 9 to atmosphere by way of the passages 102 and 116, chamber 101, past the unseated valve 110, through the bore and passage 108 to chamber 98, and thence to atmosphere by way of passage 99. With the pressure of fluid thus released from chamber 121 in the brake cylinder device 9 the spring 127 will move the piston 120 to the position in which it is shown in Fig. 1, thereby effecting a release of the vehicle brakes in the usual manner.

*Application and release of brakes—fully loaded vehicle*

When the vehicle is fully loaded and the brake pipe is charged from atmosphere, the measuring element 10 will undergo its longest travel and therefore the diaphragm carrying member 91 will be positioned in its extreme right-hand position. It will be understood however, that the diaphragm positioning bar 59 has just previously been shifted by the spring 92 to the position in which it is shown in the drawing and thereafter shifted to its fully loaded position. Upon a subsequent application of the brakes being effected in the usual manner, fluid under pressure will again flow to chamber 121 in the brake cylinder device 9 and from there to chamber 94 in relay valve mechanism 57 in the manner previously described. Now, however, fluid under pressure in chamber 94 will have no effect upon the relay valve mechanism 57, since the carrying member 91 in its extreme right-hand position will locate the diaphragm 93 so that it may engage the movable abutment 105 tangentially only. The thrust member 104 will not be actuated out of the position in which it is shown in Fig. 2 and consequently the valves 110 and 113 will remain seated as shown. The full amount of fluid under pressure supplied by the brake controlling valve device 3 for applying the brakes will be delivered to chamber 121 only, and will become effective over the whole area of a piston 120, and the brake cylinder device 9 will exert a force on the brake shoes sufficient to brake a fully loaded vehicle. The fluid in chamber 123 displaced by the outward movement of the piston 120 will flow by way of passage 102 to chamber 101 where it will act upon the diaphragm 100 so as to effect the unseating of the valve 110. With valve 110 unseated fluid under pressure in chamber 123 will be exhausted to atmosphere by way of passage 102, chamber 101, past valve 110, through passage 108, chamber 98 and passage 99.

Figure 3:
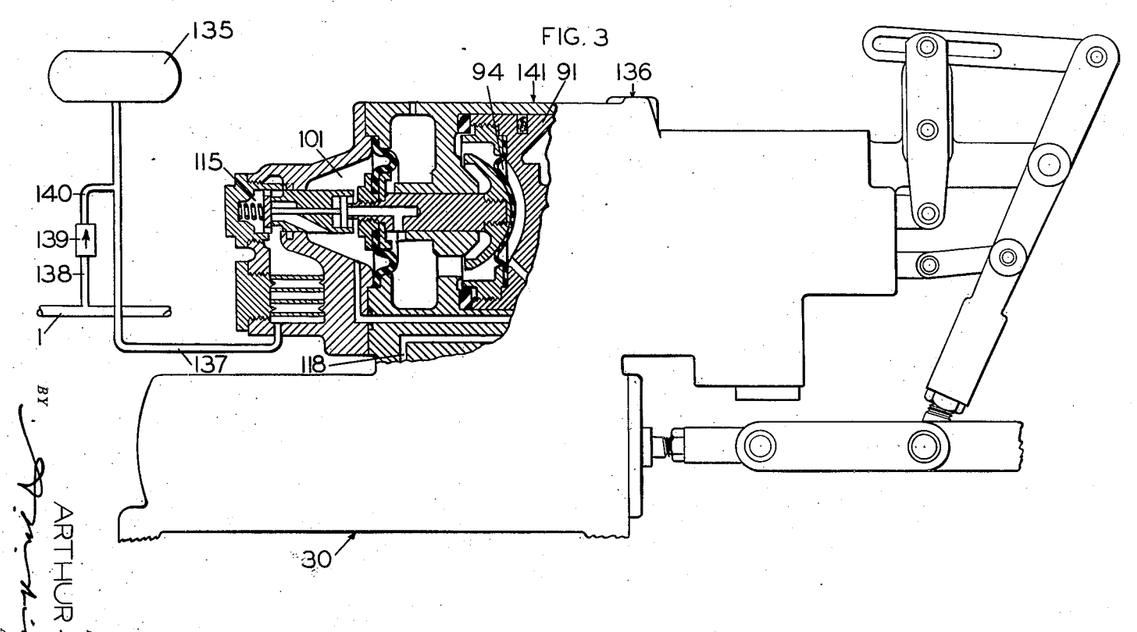
Fig. 3 is a view partly in section of a modification of the equipment shown in Fig. 2.

DESCRIPTION OF THE APPARATUS SHOWN IN FIG. 3

As previously stated, when the variable load valve mechanism 8 shown in Figs. 1 and 2 is conditioned for braking an empty vehicle, a portion of the fluid under pressure supplied from the brake controlling valve device 3 to the chamber 121 in the brake cylinder device 9 is admitted to the chamber 123 before the piston 120 moves outwardly. Then as the piston moves outward a part of the fluid in chamber 123 is vented to atmosphere by the operation of the relay valve mechanism 57. It will be apparent therefore that, since the amount of fluid under pressure utilized by the brake cylinder device 9 decreases as the load increases, the pressure at which the fluid pressure in the auxiliary reservoir 4 equalizes with chamber 121 upon approximately a twenty pound or full service reduction in brake pipe pressure, or, the pressure at which the fluid pressure in both auxiliary and emergency reservoirs equalize with the chamber 121 upon an emergency reduction in brake pipe pressure, increases as the load increases. If for any reason it should be desired to obviate this result a modified form of the invention may be provided.

In Fig. 3 this modified form of the invention is illustrated whereby the fluid under pressure delivered by way of passage 102 to chamber 123 of the brake cylinder device 9 is supplied from a supplementary reservoir 135 which is arranged to be charged with fluid under pressure from the brake pipe 1 and is entirely separate from the brake controlling valve device 3 and its associated reservoirs 4 and 5. In this form of the invention the variable load valve mechanism 136 is substantially the same as the load valve mechanism 8 shown in Figs. 1 and 2, the difference residing in the communications to the chamber 115 which chamber was described in connection with the variable load valve mechanism 8 shown in Fig. 2. As shown in Fig. 3, chamber 115 of the variable load valve mechanism 136 is in constant open communication with the supplementary reservoir 135 only, the communication being effected by means of a passage and pipe 137. For supplying fluid under pressure to the reservoir 135 the brake pipe 1 is connected to the pipe 137 by way of a pipe 138, check valve 139 and pipe 140, the check valve permitting the flow of fluid under pressure only in a direction away from the brake pipe and toward the reservoir.

OPERATION OF THE APPARATUS SHOWN IN FIG. 3

When a car provided with the brake apparatus embodying the variable load valve mechanism 136 is cut into a train and the brake pipe charged with fluid under pressure, such fluid will flow to the various devices of this apparatus and effect their operation in the same manner as already described in connection with Figs. 1 and 2. In addition, fluid under pressure in the brake pipe 1 will also flow to the supplementary reservoir 135 by way of a pipe 138, a check valve 139, a pipe 140 and the pipe 137.

When it is desired to effect an application of the brakes, the brake pipe pressure is reduced in the usual manner, causing the brake controlling valve device 3 to operate in the same manner as hereinbefore described. Fluid under pressure supplied from the auxiliary reservoir 4 to chamber 121 in the brake cylinder device 9 will flow by way of passages 118 and 117 and the control diaphragm chamber 94 of the relay valve mechanism 141 of the variable load valve mechanism 136. If the apparatus is conditioned for braking an empty or partially loaded vehicle, the relay valve mechanism 141 in response to the pressure of fluid thus supplied will operate the self-lapping valve arrangement therein to supply fluid under pressure in chamber 115 to the pressure chamber 123 in the brake cylinder device 9. Since chamber 121 is not connected in this case to chamber 115, this flow will have no effect on the pressure of fluid in chamber 121. Consequently the pressure of fluid in chamber 121 at the point of equalization or full service reduction in brake pipe pressure will be the same each time regardless of the load condition of the vehicle. Likewise the pressure of fluid in chamber 121 will be the same for each emergency application regardless of the load condition of the vehicle.

SUMMARY

By the use of this invention it will be seen that there is provided a variable load apparatus which will operate in conjunction with the standard AB freight brake equipment without necessitating any changes therein. When the brake pipe pressure has previously been reduced to atmosphere in the usual manner, the cut-off valve device 6 is conditioned at approximately 20 pounds brake pipe pressure to supply fluid under pressure, delivered thereto from the brake pipe, to the load measuring cylinder 30 of the variable load valve mechanism 8. Upon charging the brake pipe above atmospheric pressure in the usual manner, fluid delivered by way of the cut-off valve device acts on the load measuring mechanism 30 to actuate the measuring element 10 into engagement with the surface 15 of a vertically stationary part of the vehicle. At the same time the adjusting mechanism 56, in response to the operation of the load measuring cylinder 30, unlocks the diaphragm positioning bar 59 and positions it according to the degree of travel of the measuring element 10, the travel of the measuring element 10 and the displacement of the diaphragm carrying member 91 and diaphragm 93 to the right from the position in which it is shown will increase as the weight of the lading on the vehicle increases. When the brake pipe pressure is increased to approximately 50 pounds the cut-off valve device will interrupt the supply of fluid under pressure to the load measuring cylinder 30 and vent the fluid under pressure already supplied thereto to atmosphere. Now when an application of the brakes is effected, fluid under pressure is supplied from the brake controlling valve device 3 by way of the pipe 122 to the piston chamber 121 at one side of the brake cylinder piston 120 and the control diaphragm chamber 94 in the relay valve mechanism 57 of the variable load valve mechanism. In response to the pressure of fluid thus supplied, the relay valve mechanism 57 will operate the self-lapping valve arrangement therein to supply a portion of the fluid under pressure supplied thereto to the pressure chamber 123 at the opposite side of the brake cylinder piston thereby reducing the effectiveness of the piston 120. The degree of activity of the relay valve mechanism, and consequently the amount of fluid under pressure supplied to the chamber 123 of the brake cylinder device 9, decreases as the diaphragm 93 is displaced to the right by the diaphragm carrying member 91. The proportionality, or relation, between the amount of fluid supplied to the chamber 123 and the degree of displacement of the diaphragm 93 may be directly, that is, in a straight line characteristic, or may be given other characteristics by the simple expedient of changing the shape of the surface 106 of the movable abutment 105.

Having now described my invention, what I claim as new and desire to secure by Letters Patent, is:

1. A fluid pressure control mechanism comprising a casing having a chamber to which fluid under pressure may be supplied and in which the pressure of fluid may be varied to effect the control of a device to be controlled, valve means operative to admit fluid under pressure to said chamber, a control element operatively engaging said valve means and being responsive to a control fluid pressure to admit fluid under pressure to said chamber, means subject to the pressure of fluid in said chamber and operative to actuate said valve means to cut off the supply of fluid to the chamber when the force of the means exceeds the actuating force of said control element, said control element being movable relative to said valve means to different positions to produce different actuating forces on said valve means in response to a given control fluid pressure, and means operative to move said control element relative to said valve means.

2. A fluid pressure control mechanism comprising a casing having a chamber to which fluid under pressure may be supplied and in which the pressure of fluid may be varied to effect the control of a fluid pressure responsive device to be controlled, valve means operative to admit fluid under pressure to said chamber, control means responsive to fluid pressure for actuating said valve means to admit fluid under pressure to said chamber, means responsive to the pressure of fluid in said chamber and acting in opposition to the pressure of fluid acting on said control means for effecting the operation of said valve means to cut off the supply of fluid under pressure to said chamber, and a member shiftable relative to said valve means for moving said control means to different positions to correspondingly vary the effectiveness of the control means to actuate said valve means.

3. A fluid pressure control mechanism comprising a casing having a chamber to which fluid under pressure may be supplied and in which the pressure of fluid may be varied for effecting the control of a device to be controlled, valve means operative to supply fluid under pressure to said chamber, a movable abutment constituting a part of said valve mechanism and having a substantially convex end face, control means for actuating said valve means, said control means comprising a diaphragm operatively engaging said end face of the movable abutment and being responsive to a control fluid pressure for actuating said abutment and thereby said valve means, and said diaphragm being movable relative to said abutment to different positions to provide different areas of engagement between the diaphragm and the end face of the abutment, a member mounted in said casing and carrying said diaphragm and being movable relative to said casing for positioning said diaphragm with relation to said abutment, and means subject to the pressure of fluid in said chamber yieldably opposing the operation of said valve means by said diaphragm and operative to effect the operation of said valve means to cut off the supply of fluid to said chamber when the force of said means exceeds the actuating force of said diaphragm.

4. A fluid pressure control mechanism comprising a casing having a chamber to which fluid under pressure may be admitted and from which fluid under pressure may flow to a device to be controlled, valve means operative to admit fluid under pressure to said chamber, control means movable to different positions relative to said valve means and operative in its different positions to actuate said valve means to admit fluid under pressure to said chamber, said control means comprising a flexible diaphragm responsive to a control pressure for actuating said valve means, said diaphragm and valve means cooperating in the different positions of the diaphragm to establish different effective pressure areas for the diaphragm, and means subject to the pressure of fluid in said chamber and operative when the force of said means exceeds the force of said diaphragm to effect the operation of said valve means to cut off the admission of fluid under pressure to said chamber.

5. A fluid pressure control mechanism comprising a casing having a chamber to which fluid under pressure may be admitted and in which the pressure of fluid may be varied to effect the control of a device to be controlled, valve means operative to admit fluid under pressure to said chamber, control means movable to different positions with relation to said valve means and operative in its different positions in response to a control fluid pressure to actuate said valve means to admit fluid under pressure to said chamber, said control means and said valve means cooperating in the different positions of the control means to establish correspondingly different effective areas of said control means over which the control fluid pressure acts to actuate the valve means, and means subject to the pressure of fluid admitted to said chamber yieldably opposing the force exerted on said valve means by said control means and being operative when the force of said means exceeds the actuating force of said control means to actuate said valve means to cut off the admission of fluid under pressure to said chamber.

6. A fluid pressure control mechanism comprising a casing having a chamber to which fluid under pressure may be admitted and from which fluid under pressure may flow to a device to be controlled, valve means operative to admit fluid under pressure to said chamber, a member mounted in said casing and being movable relative to said valve means, said member having a control chamber to which fluid under pressure may be supplied, a control element carried by and movable with said member to different positions relative to said valve means, said control element in its different positions being operative relative to said member in response to the pressure of fluid supplied to said control chamber for actuating said valve means, the control element and valve means cooperating in the different positions of the control element to condition the control element to exert correspondingly different actuating forces on said valve means in response to any given fluid pressure in said control chamber, and means subject to the pressure of fluid in the first mentioned chamber yieldably opposing the operation of said valve means by said control element and being operative when the force exerted by said means on said valve means exceeds the force exerted by said control element on said valve means for actuating said valve means to cut off the admission of fluid under pressure to the first mentioned chamber.

7. A fluid pressure control mechanism comprising a casing having a chamber to which fluid under pressure may be supplied and in which the pressure of fluid may be varied to effect the control of a device to be controlled, valve means operative to admit fluid under pressure to said chamber, a control element operatively engaging said valve means and being responsive to a control fluid pressure for actuating said valve means to admit fluid under pressure to said chamber, means subject to the pressure of fluid in said chamber and operative to actuate said valve means to cut off the supply of fluid to the chamber when the force of the means exceeds the actuating force of said control element, said control element being movable relative to said valve means to different positions to produce different actuating forces on said valve means in response to a given control fluid pressure, and said means being operative in response to a reduction in the control fluid pressure acting on said control element for actuating said valve means to effect a reduction in the pressure of fluid in said chamber, and means operative to move said control element relative to said valve means.

8. In a vehicle variable load fluid pressure brake equipment, a brake cylinder device, means operative to supply fluid under pressure to effect the operation of said brake cylinder device to apply the brakes, and means operative in response to the pressure of fluid being supplied to the brake cylinder device to cause a force to be established to oppose the brake applying operation of the brake cylinder device, the second mentioned means being conditionable according to different weights of load carried by the vehicle to create correspondingly different forces to oppose the brake applying operation of the brake cylinder device.

9. In a vehicle variable load fluid pressure brake equipment, a brake cylinder, a brake pipe normally charged with fluid under pressure, means operative upon a reduction in brake pipe pressure to supply fluid under pressure to the brake cylinder to effect an application of the brakes, and means operative in response to the pressure of fluid supplied to the brake cylinder to supply fluid under pressure to establish a force in opposition to the action of the brake cylinder and thereby control the braking force exerted by the brake cylinder, said means being conditionable according to different weights of load carried by the vehicle for operation to regulate the supply of fluid to establish correspondingly different forces in opposition to the action of the brake cylinder.

10. In a vehicle variable load fluid pressure brake equipment, a brake cylinder device comprising a cylinder and a piston operatively mounted in said cylinder for operation to effect an application of the brakes, said piston dividing the cylinder into two fluid receiving chambers, means operative to admit fluid under pressure to one brake cylinder chamber to cause said piston to operate to effect the application of the brakes, and means operative in response to the pressure of fluid admitted to said one brake cylinder chamber for admitting fluid under pressure to the other brake cylinder chamber to modify the braking force exerted by said piston, said means being conditionable according to different weights of the load carried by the vehicle to operate to admit correspondingly different pressures of fluid to said other brake cylinder chamber.

11. In a vehicle variable load fluid pressure brake equipment, a brake cylinder device comprising a cylinder and a piston operatively mounted in said cylinder for operation to effect an application of the brakes, said piston dividing the cylinder into two fluid receiving chambers, means operative to admit fluid under pressure to one brake cylinder chamber to cause said piston to operate to effect an application of the brakes, valve means operative to admit fluid under pressure to the other brake cylinder chamber to exert an opposing force on said piston, control means responsive to the pressure of fluid in said one brake cylinder chamber for actuating said valve means to admit fluid under pressure to said other brake cylinder chamber, and means subject to the pressure of fluid admitted to said other brake cylinder chamber to oppose the operation of said valve means and operative when the opposing force of the means exceeds the force of the said control means to cut off the admission of fluid under pressure to said other chamber, said control means being conditionable according to different weights of lading carried by the vehicle to transmit different actuating forces to said valve means under the influence of a given fluid pressure acting thereon.

12. In a variable load brake equipment for vehicles, brake controlling means operative by fluid under pressure to effect an application of the brakes, valve means operative to supply fluid under pressure for actuating said brake controlling means, means adapted to be subjected to pressure of fluid to yieldably oppose the operation of the brake controlling means and thereby modify the braking force exerted by the brake controlling means, and control means operative in response to the pressure of fluid being supplied to said brake controlling means for subjecting said means to pressure of fluid and to control the degree of pressure fluid to which the means is subjected, said control means being conditionable according to different weights of lading carried by the vehicle for operation to cause said means to be subjected to different degrees of fluid pressure.

13. In a variable load brake equipment for vehicles, brake controlling means operative by fluid under pressure to effect an application of the brakes, valve means operative to supply fluid under pressure for actuating said brake controlling means, means adapted to be subjected to the pressure of fluid to yieldably oppose the operation of the brake controlling means and thereby modify the braking force exerted by the brake controlling means, and control means operative in response to the pressure of fluid being supplied to said brake controlling means for subjecting said means to the pressure of fluid and to control the degree of pressure to which the means is subjected, said control means being variously conditionable to operate to cause said means to be subjected to different degrees of fluid pressure, and means operative according to different weights of lading carried by the vehicle for conditioning said control means.

14. In a variable load brake equipment for vehicles, brake controlling means operative by fluid under pressure to effect an application of the brakes, valve means operative to supply fluid under pressure for actuating said brake controlling means, means adapted to be subjected to the pressure of fluid to yieldably oppose the operation of the brake controlling means and thereby modify the braking force exerted by the brake controlling means, and control means operative in response to the pressure of fluid being supplied to said brake controlling means for subjecting said means to the pressure of fluid and to control the degree of pressure to which the means is subjected, said control means being conditionable when the vehicle is empty to cause said means to be subjected to a certain maximum degree of fluid pressure and being conditionable when the vehicle is partially loaded to cause the means to be subjected to a lesser degree of fluid pressure, and being rendered ineffective, when the vehicle is heavily loaded, to operate to subject said means to the pressure of fluid.

15. In a variable load brake equipment for vehicles, brake controlling means operative by fluid under pressure to effect an application of the brakes, valve means operative to supply fluid under pressure for actuating said brake controlling means, means adapted to be subjected to the pressure of fluid to yieldably oppose the operation of the brake controlling means and thereby modify the braking force exerted by the brake controlling means, and control means operative in response to the pressure of fluid being supplied to said brake controlling means for subjecting said means to the pressure of fluid and to control the degree of pressure to which the means is subjected, said control means being variously conditionable to operate to cause said means to be subjected to different degrees of fluid pressure, and means operative when the vehicle is empty or partially loaded to condition said mechanism and operative when the vehicle is heavily loaded for rendering said control means ineffective to operate to subject said means to fluid pressure.

16. In a variable load brake equipment for vehicles, in combination, a brake cylinder comprising a cylinder and a piston operatively mounted in the cylinder for operation to effect an application of the brakes, said piston dividing the cylinder into two fluid receiving chambers, means operative to supply fluid under pressure to one brake cylinder chamber to effect an application of the brakes, and means responsive to the pressure of fluid admitted to said one brake cylinder chamber to admit fluid under pressure to the other brake cylinder chamber to oppose the effect of fluid under pressure in said one brake cylinder chamber and being responsive to the pressure of fluid in said other brake cylinder chamber for controlling the degree of pressure in the said other brake cylinder chamber, said means being conditionable according to different weights of lading carried by the vehicle to provide correspondingly different degrees of fluid pressure in said other brake cylinder chamber for any given degree of fluid pressure in said one brake cylinder chamber.

17. In a variable load brake equipment for vehicles, in combination, a brake cylinder comprising a cylinder and a piston operatively mounted in the cylinder for operation to effect an application of the brakes, and piston dividing the cylinder into two fluid receiving chambers, means operative to supply fluid under pressure to one brake cylinder chamber to effect an application of the brakes, and means responsive to the pressure of fluid admitted to said one brake cylinder chamber to admit fluid under pressure to the other brake cylinder chamber to oppose the effect of fluid under pressure in said one brake cylinder chamber and being responsive to the pressure of fluid in said other brake cylinder chamber for controlling the degree of pressure in the said other brake cylinder chamber, said means being conditionable, when the vehicle is empty, for operation to provide a certain maximum degree of fluid pressure in said other brake cylinder chamber and being conditionable when the vehicle is partially loaded to provide a lesser degree of fluid pressure in said other brake cylinder chamber and being rendered ineffective, when the vehicle is to a greater degree loaded, to provide fluid under pressure in said other brake cylinder chamber, and a mechanism operative according to whether the vehicle is empty or loaded to condition said means for operation to control the pressure of fluid in said other brake cylinder chamber.

18. A vehicle fluid pressure brake equipment comprising a brake cylinder device having a piston operable to effect an application of the brakes and also having two chambers located respectively at opposite sides of the piston, means for supplying fluid under pressure to one of said chambers for effecting the operation of said piston, valve means responsive to the pressure of fluid in said one chamber to supply fluid under pressure to the other chamber, and control means responsive to the pressure of fluid in said other chamber to cut off the supply of fluid under pressure thereto, said control means including a diaphragm which responds to the pressure of fluid in said other chamber to operate said valve means and which is shiftable to different positions relative to said valve means to cooperate with the valve means for varying its effective area.

19. A vehicle fluid pressure brake equipment comprising a brake cylinder device having a piston operable to effect an application of the brake and having two chambers located respectively at opposite sides of the piston, means for supplying fluid under pressure to one of said chambers for effecting the operation of said piston, valve means responsive to the pressure of fluid in said one chamber to supply fluid under pressure to the other chamber, control means responsive to the pressure of fluid in said other chamber to operate said valve means to cut off the supply of fluid under pressure thereto, said control means including a diaphragm which responds to the pressure of fluid in said other chamber to operate said valve means and which is shiftable to different positions relative to said valve means to cooperate with the valve means for varying its effective area, and means operative for shifting said diaphragm to its different positions.

20. A vehicle fluid pressure brake equipment comprising a brake cylinder device having a piston operable to effect an application of the brakes and having two chambers located respectively at opposite sides of the piston, means for supplying fluid under pressure to one of said chambers for effecting the operation of said piston, a valve means responsive to the pressure of fluid in said one chamber to supply fluid under pressure to the other of said chambers, and means responsive to the pressure of fluid in said other chamber to actuate said valve means to cut off the supply of fluid under pressure to the chamber and being operative as the piston moves to effect an application of the brakes to vent fluid under pressure from said other chamber to thereby insure against an increase in the pressure of fluid in the chamber due to the brake applying movement of the piston.

21. In a fluid pressure brake equipment, a brake cylinder device comprising a casing, a piston operatively mounted in said casing and dividing the cylinder into two fluid receiving chambers, means operative to supply fluid under pressure to one brake cylinder chamber for effecting the operation of said piston to apply the brakes, valve means responsive to the pressure of fluid being supplied to said one brake cylinder chamber to supply fluid under pressure to the other brake cylinder chamber, pressure sensitive means responsive to the pressure of fluid being supplied to said other brake cylinder chamber to actuate said valve means to cut off the supply of fluid to the other chamber and being also operative in response to an increase in the pressure of fluid in said other brake cylinder chamber, incident to the movement of the piston in the brake applying direction, to vent fluid under pressure from the other chamber.

22. In a vehicle fluid pressure brake equipment, a brake cylinder device comprising a casing, a piston operatively mounted in said casing and dividing the casing into two brake cylinder chambers, means operative to supply fluid under pressure to one brake cylinder chamber for effecting the operation of said piston to apply the brakes, valve means responsive to the pressure of fluid being supplied to said one brake cylinder chamber for supplying fluid under pressure to said other brake cylinder chamber to yieldably oppose the movement of said piston in its brake applying direction, and means responsive to a predetermined increase in the pressure of fluid in said other brake cylinder chamber for actuating said valve means to cut off the supply of fluid under pressure to the chamber, and being operative in response to a further increase in the pressure of fluid in the chamber incident to the movement of said piston in its brake applying direction, for venting fluid from the chamber to dispel said further increase and thereby maintain the fluid in the other chamber at substantially the said predetermined pressure.

23. In a vehicle fluid pressure brake equipment, a brake cylinder device comprising a casing, a piston operatively mounted in said casing and dividing the casing into two brake cylinder chambers, means operative to supply fluid under pressure to one brake cylinder chamber for effecting the operation of said piston to apply the brakes, valve means responsive to the pressure of fluid being supplied to said one brake cylinder chamber for supplying fluid under pressure to said other brake cylinder chamber to yieldably oppose the movement of said piston in its brake applying direction, and a flexible diaphragm responsive to a predetermined increase in the pressure of fluid in said other brake cylinder chamber for actuating said valve means to cut off the supply of fluid under pressure to the chamber, said piston in its movement in the brake applying direction increasing the pressure of fluid in the chamber above said predetermined pressure, said diaphragm being responsive to the increase in the pressure of fluid in the chamber above said predetermined pressure for venting fluid under pressure from the chamber to maintain the fluid in the chamber at substantially said predetermined pressure for the full travel of said piston in its brake applying direction.

24. In a vehicle fluid pressure brake equipment, a brake cylinder device comprising a casing, a piston operatively mounted in said casing and dividing the casing into two brake cylinder chambers, means operative to supply fluid under pressure to one brake cylinder chamber for effecting the operation of said piston to apply the brakes, valve means responsive to the pressure of fluid being supplied to said one brake cylinder chamber for supplying fluid under pressure to said other brake cylinder chamber to yieldably oppose the movement of said piston in its brake applying direction, and a flexible diaphragm responsive to a predetermined increase in the pressure of fluid in said other brake cylinder chamber for actuating said valve means to cut off the supply of fluid under pressure to the other chamber, said piston in its movement in the brake applying direction increasing the pressure of fluid in the other chamber above said predetermined pressure, said diaphragm being responsive to the increase in the pressure of fluid in the other chamber above said predetermined pressure for venting fluid under pressure from the other chamber to maintain the fluid in the other chamber at substantially said predetermined pressure for the full travel of said piston in its brake applying direction, and means for actuating said valve means to cut off the venting of fluid under pressure from said other brake cylinder chamber when said piston reaches the end of its brake applying travel.

25. In a control mechanism for a fluid pressure system, said mechanism comprising a casing having a fluid pressure inlet passage to which fluid under pressure may be supplied and also having a fluid pressure outlet passage through which fluid under pressure may be admitted to a device to be controlled, valve means operative in one direction to supply fluid under pressure from said inlet passage to said outlet passage, and operative in the opposite direction to cut off the supply of fluid under pressure from said inlet passage to said outlet passage, a first flexible diaphragm operative by fluid under pressure in said inlet passage for actuating said valve means in said one direction, a second flexible diaphragm operative by fluid under pressure being supplied to said outlet passage for actuating said valve means in said opposite direction when the force exerted on the valve means by the second diaphragm exceeds the force exerted on the valve means by said first diaphragm, two spaced stops carried by said casing, a member mounted in said casing for movement between said stops and carrying said first diaphragm, said first diaphragm when said member is in engagement with one of said stops, being operative to exert a certain maximum actuating force on said valve means and said first diaphragm when said member is in engagement with the other of said stops being rendered ineffective to actuate said valve means, said first diaphragm, with said member in any position intermediate said stops, exerting an actuating force on said valve means less than said certain maximum force, a valve having one position in which fluid under pressure from said inlet passage is supplied to act on said first diaphragm and having a second position in which the supply of fluid to act on the said first diaphragm is cut off and the fluid under pressure acting on the second diaphragm is vented, means locking said member against movement relative to said valve means, means operative to actuate said valve from its said first position to its said second position and to then actuate the locking means to unlock said member and finally to move said member, and thereby said first diaphragm, said means being subsequently operative to first effect the operation of said locking means to lock said member and diaphragm in the position to which they have been moved and to then effect the movement of said valve to its said first position.

26. In a fluid pressure control valve device comprising a casing having a fluid pressure inlet passage and a fluid pressure outlet passage, valve means operative to supply fluid under pressure from said inlet passage to said outlet passage, means for actuating said valve means, said means comprising an element responsive to the pressure of fluid in said inlet passage for actuating the valve means, a member operative to move said element relative to said valve means to different positions, said element in its different positions exerting different actuating forces on said valve means for a given fluid pressure acting thereon, actuating means for said valve means subject to the pressure of fluid in said outlet passage and operative, when the force exerted thereby on said valve means exceeds the force exerted on the valve means by said element, to actuate the valve means to cut off the supply of fluid under pressure to said outlet passage, a valve having one position in which fluid under pressure from said inlet passage is supplied to act on said element and having another position in which the supply of fluid under pressure to the element is cut off and the fluid acting on the element is discharged to the atmosphere, locking means for engagement with said member to lock the member and thereby said element in any particular one of its different positions, mechanism operative in one direction of movement to first move said valve from said one position to its other position, to then move said locking means out of locking engagement with said member and to then move said member to a particular position, means operative upon movement of said locking means out of locking engagement with said member for moving the member in the direction toward said valve means to a given position, said mechanism being operative in the opposite direction of movement for first effecting the operation of said locking means to lock said member in said particular position and to then effect the operation of said valve from its said other position to its said one position.

27. In a fluid pressure control valve device comprising a casing having a fluid pressure inlet passage and also having a fluid pressure outlet passage, valve means operative to one position to supply fluid under pressure from said inlet passage to said outlet passage and operative to another position to cut off the supply of fluid under pressure to the outlet passage, an element movable to a plurality of different positions relative to said valve means and being responsive in any of its different positions to the pressure of fluid in said inlet passage to actuate the valve means to supply fluid under pressure to said outlet passage, the force exerted by said element on the valve means for any given fluid pressure acting thereon being different in each of its positions, means subject to the pressure of fluid in said outlet passage for actuating said valve means, when the force it exerts on said valve means exceeds the force exerted on the valve means by said element, to cut off the supply of fluid under pressure to said outlet passage, a member carrying said element and being slidably guided in said casing for moving the element to its different positions with relation to said valve means, a valve having a first position in which fluid under pressure from said inlet passage is supplied to act on said element and having a second position in which the supply of fluid under pressure to the element is cut off and in which the fluid under pressure acting on the element is discharged to the atmosphere, a first pawl engaging said member to lock the member against movement in a direction away from said valve means, a second pawl engaging said member to lock the member against movement in the direction toward said valve means, a mechanism operative to first actuate said valve from its said first position to its said second position, to then actuate said first pawl to its unlocking position and to then actuate said second pawl to its unlocking position, means for moving said member and thereby said element in the direction toward said valve means upon movement of the said first pawl to its unlocking position, said member after it has been moved by said means being moved by said mechanism to a particular one of its different positions, said mechanism being operative, when said member is in its particular position, to first effect movement of said pawls into locking engagement with said member and to then move said valve from its said second position to its said first position.

28. In a variable load fluid pressure brake equipment for a vehicle, the combination with a brake pipe normally charged with fluid under pressure, a brake cylinder, and a brake controlling valve device responsive to a reduction in brake pipe pressure to supply fluid under pressure to the brake cylinder to cause the brake cylinder to operate to effect an application of the brakes, of valve means operative to supply fluid under pressure being supplied to said brake cylinder to oppose the operation of the brake cylinder in its operation to effect an application of the brakes and operative to cut off the supply of fluid under pressure opposing the operation of the brake cylinder, a fluid pressure sensitive element operative in response to the pressure of fluid supplied by said brake controlling valve device for actuating said valve means to supply fluid under pressure, a member carrying said fluid pressure sensitive element and operative upon movement in the direction toward said valve means for rendering the element effective to exert a maximum actuating force on said valve means in response to a given fluid pressure acting on the element, and operative upon movement in the opposite direction for rendering the element effective to exert a lesser actuating force on the valve means in response to said given fluid pressure, means included in said valve means subject to the pressure of fluid supplied by said valve means yieldably opposing the operation of the valve means by said element and operative when the force it exerts on the valve means exceeds the force exerted by said element for actuating the valve means to its cut off position, means locking said member against movement, a valve having one position in which said element is subjected to the pressure of fluid and having another position in which the supply of fluid under pressure to said element is cut off and in which the fluid under pressure acting on the element is discharged to the atmosphere, piston means operative by fluid under pressure being supplied to the brake pipe in initially charging the equipment to first actuate said valve from its said one position to its said other position, to then actuate the locking means to unlocking position and to then position said member and thereby said element relative to said valve means, a cut-off valve device operative in response to a chosen increase in brake pipe pressure for cutting off communication between the brake pipe and said piston means and for venting fluid under pressure acting on the piston means said piston means being operative upon the venting of the fluid under pressure acting thereon for first effecting the operation of the locking means to lock said member and element in the position to which they have been moved and to then move said valve from its said other position to its said one position.

29. A variable control mechanism comprising a control element having a normal position and movable therefrom to various other positions of adjustment, resilient means constantly urging said control element toward its normal position, power means operative to move said control element out of said normal position to one of said various other positions of adjustment against the opposing force of said resilient means, a locking means for locking said control element in its adjusted position against movement in a direction toward its normal position, and means operative by said power means to render said locking means ineffective prior to the movement of said control element and to render said locking means effective at all other times.

30. A variable control mechanism comprising an element which may be adjusted for varying the control of said mechanism, said element having a normal position and being movable therefrom to various other positions of adjustment, resilient means constantly urging said control element toward its normal position, power means operative to actuate said control element against the opposing force of said resilient means out of said normal position to a predetermined adjusted position, pawl means for preventing movement of said control element toward its normal position and operable to lock said element in its adjusted position, dog means for holding said pawl means in locking relation with said element, cam means operative as an incident to the movement of said power means for actuating said element to first render said dog means and then said pawl means ineffective, means for rendering said pawl means effective during the adjusting movement of said element to prevent movement of said element toward said normal position, and means operatively associated with said power means operative to render said dog means effective after said element has reached its predetermined adjusted position.

31. In a control mechanism for a fluid pressure system, in combination, a control member having a normal control position and being shiftable therefrom to various other control positions, spring means urging said member toward said normal position, a fluid pressure motor for shifting said control member to one of said various other control positions, a linkage connecting said motor to said control member for positioning the member, said linkage comprising an element providing for lost motion in the preliminary operation of said motor, latching means for locking and unlocking said control member in the position to which it is shifted, and means operative by said motor for actuating said latching means to unlock said control member during the lost motion movement of said linkage and thereafter to render said latching means effective to lock said control member in the position to which it has been shifted.

32. In a control mechanism for a fluid pressure system, in combination, a control member having a normal control position and being shiftable therefrom to various other control positions, resilient means constantly urging said control member toward its normal position, a fluid pressure motor for actuating said member to a predetermined control position, a linkage connecting said motor to said control member for positioning the member, said linkage comprising an element providing for lost motion during the preliminary operation of said motor, locking means for locking said member against movement toward its normal position, and means positively connected to said linkage and operative during the lost motion movement of the motor and linkage to render the locking means temporarily ineffective.

33. A vehicle variable load brake equipment comprising a control element having an empty position and being movable therefrom to a plurality of other positions for varying the braking power of the brake equipment according to the load on the vehicle, power means operative to shift said element out of said empty position to a position determined according to load, resilient means constantly urging said control element toward empty position, locking means for locking said element against movement, means operative by said power means prior to shifting said element to render said locking means ineffective, and means for rendering said locking means effective upon movement of said element out of empty position by said power means.

34. In a control mechanism for a fluid pressure system, in combination, a control member having a normal control position and being shiftable therefrom to various other control positions, resilient means constantly urging said control member toward its normal position, a fluid pressure motor operable in one direction for actuating said control member to a predetermined control position, a linkage connecting said motor to said control member for positioning the member, said linkage comprising an element providing for lost motion in the preliminary operation of said motor in either direction, pawl means for locking said member against movement toward its normal position, a dog means for holding said pawl means in locking relation with said control member, a cam means positively connected to said linkage operative during the lost motion movement of said motor in said one direction to render said dog means and then said pawl means ineffective, another cam means positively connected to said linkage operative during the shifting movement of said control member out of said normal control position to render said pawl means effective, and means for rendering said dog means effective during the preliminary operation of the motor in the opposite direction.

35. A vehicle variable load brake equipment comprising a control element having an empty position and being movable therefrom to a plurality of other positions for varying the braking power of the brake equipment according to the load on the vehicle, resilient means for urging said control element toward empty position, power means operative to overpower said resilient means and shift said element out of said empty position to a position determined according to load, locking means for locking said element, means operative by said power means upon initial operation thereof to render said locking means ineffective prior to shifting said element, and means for rendering said locking means effective upon movement of said element out of empty position by said power means.

36. In a control mechanism for a fluid pressure system, in combination, a control member having a normal control position, resilient means urging said control member toward its normal position, a fluid pressure chamber in said member, a diaphragm serving to define said chamber and responsive to pressure of fluid supplied to the chamber to cause said control member to exert a force in a direction away from its said normal position, valve means having a normal position for permitting fluid under pressure to flow to said fluid pressure chamber and operative to another position in which the supply of fluid under pressure is cut off and said chamber is vented to atmosphere, means normally locking said member against movement, and means operative to actuate said valve from its normal position to its other position, then to actuate said locking means to unlock said member, and finally to actuate said control member to a predetermined control position, the last mentioned means being subsequently operative to first effect the operation of said locking means to lock said member in the position to which it has been moved and then to effect the movement of said valve to its said normal position.

37. A variable control mechanism comprising an adjustable control member adapted to be subjected on one side to pressure of fluid, a spring acting on the opposite side of said member, valve means for varying pressure of fluid on said one side, a valve controlling communication between said valve means and said one side of said member and operative to close said communication and connect said one side to atmosphere, power means having a lost motion connection with said control member for adjusting the control member, and means positively connected to said power means and operative by the power means during the lost motion movement thereof to effect the operation of said valve means.

38. In a fluid pressure operated load compensating brake equipment the combination with a brake pipe and a fluid pressure responsive load measuring mechanism, of valve means for controlling a communication through which fluid under pressure may be supplied from said brake pipe to said load measuring mechanism and a communication for venting said fluid under pressure from said mechanism, and movable abutment means having differential areas subject to the pressure of fluid in said brake pipe, said movable abutment means being operated by an increase in the pressure of fluid in the brake pipe from a chosen low degree of pressure to a certain higher degree of pressure to actuate said valve means to close the first named communication and open the second named communication and operative upon a decrease in the pressure of fluid in the brake pipe from said certain higher degree of pressure to said chosen low degree of pressure to close said second communication and open said first communication.

39. In a fluid pressure operated load compensating brake equipment, the combination with a brake pipe and a fluid pressure responsive load measuring mechanism, of a cut-off valve device comprising a casing having a first passage open to said brake pipe and a second passage open to said load measuring mechanism, and a third passage open to atmosphere, a normally open supply valve for controlling communication between said first passage and said second passage, a normally closed exhaust valve for controlling communication between said second passage and said third passage, a piston member for operating said supply and exhaust valves comprising a large piston subject on one side to the pressure of fluid in said first passage and on the other side to the pressure of fluid in said second passage and comprising a small piston rigidly attached to said large piston and subject on the adjacent side to the pressure of fluid in said second passage and on the other side to the atmospheric pressure in said third passage, and resilient means urging said piston member toward a position for opening said supply valve and closing said exhaust valve, said piston member being operative upon an increase in fluid pressure in said brake pipe passage from a certain degree to a chosen degree to close said supply valve and open said exhaust valve and operative upon a decrease in fluid pressure in said brake pipe passage from said chosen degree to said certain lower degree to open said supply valve and close said exhaust valve.

40. In a fluid pressure operated load compensating brake equipment, the combination with a brake pipe and a fluid pressure responsive load measuring mechanism, of a cut-off valve device comprising a casing having a first passage connected to said brake pipe, a second passage directly connected to said load measuring mechanism and a third passage open to atmosphere, valve means having one position in which said second passage is connected to said first passage and cut off from said third passage and operable to another position in which said second passage is cut off from said first passage and connected to said third passage, and movable abutment means responsive to an increase in fluid pressure in said first passage to a chosen degree to actuate said valve means to its said one position, said movable abutment means being responsive thereafter to a reduction in fluid pressure in said first passage to a predetermined lower degree to actuate said valve means to its said other position.

41. In a fluid pressure operated load compensating brake equipment, the combination with a brake pipe and a fluid pressure responsive load measuring mechanism, of a cut-off valve device comprising a casing having a first passage connected to said brake pipe, a second passage connected to said load measuring mechanism and a third passage open to atmosphere, valve means having one position in which said second passage is connected directly to said first passage and operable to another position in which said second passage is cut off from said first passage and connected to said third passage, said valve means comprising a movable abutment having a given area responsive to the pressure of fluid in said first passage when said valve means is in said one position and a second movable abutment positively connected to the first movable abutment having a different area responsive to the pressure of fluid in said first passage when said means is in said other position, and resilient means opposing the force exerted by fluid pressure on either of said movable abutments.

42. In a fluid pressure operated load compensating brake equipment, the combination with a brake pipe and a fluid pressure responsive load measuring mechanism, of a cut-off valve device comprising a casing having a first passage connected to said brake pipe, a second passage connected to said load measuring mechanism and a third passage open to atmosphere, valve means having one position in which said second passage is connected directly to said first passage and operable to another position in which said second passage is cut off from said first passage and connected to said third passage, movable abutment means for operating said valve means, said abutment means having differential areas biased by the pressure of fluid in said one passage in a direction for moving said valve means to said other position, and resilient means biasing said abutment means in a direction for moving said valve means to said one position, the effective area of the abutment means acted upon by the fluid at the pressure in said first passage being greater after said abutment means has actuated said valve means to its said other position.

43. In a vehicle fluid pressure brake equipment, a brake cylinder device, a brake pipe normally charged with fluid under pressure, a brake controlling valve device operative in response to a reduction in brake pipe pressure to supply fluid under pressure to the brake cylinder device to effect an application of the brakes and operative in response to a subsequent increase in brake pipe pressure to release fluid under pressure from the brake cylinder device, a brake cylinder pressure retaining valve device for controlling the release of fluid under pressure from the brake cylinder device by way of said brake controlling valve device and for retaining fluid at a chosen pressure in the brake cylinder, valve means operative in response to the pressure of fluid supplied to said brake cylinder to supply fluid under pressure to establish a force to oppose the action of said brake cylinder device and thereby control the braking force exerted by the brake cylinder device, said valve means being operative in response to a reduction in the pressure of fluid in the brake cylinder to reduce the pressure of fluid establishing the force acting in opposition to the action of the brake cylinder device, and said valve means being operative to terminate the reduction in the pressure of fluid establishing the force opposing the action of the brake cylinder device.

44. In a vehicle variable load fluid pressure brake equipment, a brake cylinder device comprising a casing and a piston operatively mounted therein for controlling the brakes, said piston and casing defining one chamber into which fluid under pressure may be supplied to cause said piston to operate to effect an application of the brakes and from which fluid under pressure is released to effect a relief of the brakes, said piston and casing also defining another chamber into which fluid under pressure may be supplied to act on said piston to oppose the force of fluid under pressure in said one chamber and acting on the piston and thereby modify the braking force exerted by the piston, a brake controlling valve device, operative to admit fluid under pressure to said one chamber, valve means operative in response to the pressure of fluid admitted to said one chamber for admitting fluid under pressure to said other chamber to modify the braking force exerted by said piston, said valve means being conditionable according to different weights of the load carried by the vehicle to operate to admit correspondingly different pressures of fluid to said other chamber, said brake controlling valve device being operative to release fluid under pressure from said one chamber, and a brake cylinder pressure retaining valve device operative to retain a chosen pressure in said one chamber, said valve means being conditionable according to different weights of the load carried by the vehicle to operate in response to the retained brake cylinder pressure to retain correspondingly different pressures in said other chamber.

ARTHUR J. BENT.

REFERENCES CITED

The following references are of record in the file of this patent:

UNITED STATES PATENTS

| Number | Name | Date |
|---|---|---|
| 2,173,928 | Borde et al. | Sept. 26, 1939 |